March 15, 1966    J. F. DAY    3,241,052
REACTOR LOADING CIRCUIT
Filed Oct. 24, 1961
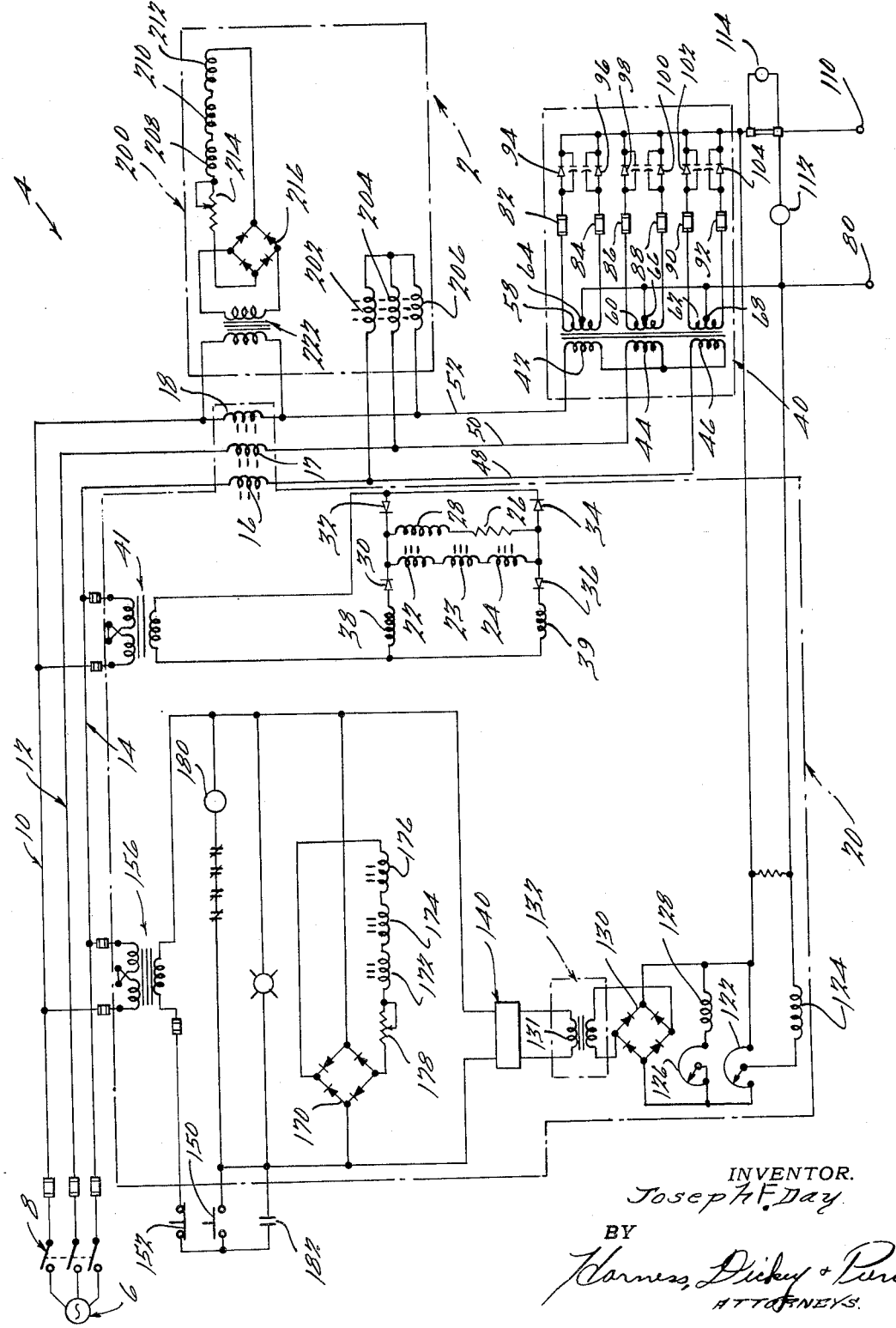
INVENTOR.
Joseph F. Day
BY
Harness, Dickey & Pierce
ATTORNEYS.

United States Patent Office 3,241,052
Patented Mar. 15, 1966

3,241,052
REACTOR LOADING CIRCUIT
Joseph F. Day, Warren, Mich., assignor to Udylite Corporation, Detroit, Mich., a corporation of Delaware
Filed Oct. 24, 1961, Ser. No. 147,288
3 Claims. (Cl. 323—89)

This invention relates generally to saturable reactors and more particularly to an improved preloading circuit for a saturable reactor.

Saturable reactors are often used for the control of, for example, a power supply where it is desired that the control have a minimum number of moving parts and be relatively dependable in operation. Such saturable reactors generally comprise an A.C. or controlled winding and a D.C. or control winding in operative association with a common iron core, the D.C. control winding producing a variable flux in the core to vary the effective permeability thereof and hence the reactance of the controlled winding.

However, saturable reactors are relatively uncontrollable when the load thereon is reduced below, for example, 10% of rated capacity. In applications where such loss of control cannot be tolerated, this problem has been solved, in saturable reactor circuits heretofore known and used, by placing a shunt load on the reactor, for example, a resistance bank. However, the power loss incident to the use of such a load resistor is appreciable when the power supply controlled by the reactor is operated at rated capacity. Accordingly, some form of switching device is generally employed to remove the load resistor from the power supply circuit when the load on the reactor is greater than, for example, 10% of rated capacity. Use of such a switching mechanism is obviously undesirable since it renders the power supply relatively susceptible to failure.

A saturable reactor preloading circuit in accordance with the instant invention obviates the need for a load resistor and its associated switching mechanism by utilizing a shunt saturable reactor to effect preloading of the main reactor at such time as load thereon is reduced to 10% or less of rated capacity. Control of the shunt saturable reactor is fully automatic after calibration since it is responsive to electrical conditions in the main reactor circuit.

Accordingly, one object of the instant invention is an improved reactor preloading circuit.

Another object is a shunt preloading circuit for a saturable reactor that automatically loads the reactor to a predetermined level upon a decrease in normal operating load below said level.

Another object is a shunt preload for a saturable reactor that is automatically removed when the reactor is loaded above a predetermined level.

Other objects and advantages of the instant invention will be apparent in the following specification, claims and drawing wherein the reactor preloading circuit of the instant invention is shown in operative association with a D.C. power supply circuit.

As seen in the drawing, a reactor preloading circuit 2 in accordance with an exemplary embodiment of the present invention, is shown in operative circuit association with a D.C. power supply circuit 4 having, for example, a 460 volt, 3 phase, 60 cycle input and an 8000 amp. 12 volt output.

The power supply circuit 4 is energized from a 460 volt, 3 phase, 60 cycle source 6 through a suitable main disconnect switch 8. Conductors 10, 12 and 14 connect the power source 6 to the A.C. or controlled windings 17, 16, and 18 of a main reactor 20.

The main reactor 20 is conventional in construction and, in addition to the controlled windings 16, 17 and 18 thereof, comprises a control circuit including D.C. control windings 22, 23 and 24 in operative association on common cores with the windings 16, 17 and 18, respectively, a feedback circuit comprising a rheostat 26 and a magnetic amplifier winding 28, a plurality of silicon diodes 30, 32, 34 and 36, and magnetic amplifier windings 38 and 39. The main reactor control circuit is energized through a control transformer 41 connected across the conductors 10 and 14.

A main transformer 40 is fed through the controlled windings 16, 17 and 18 of the main reactor 20. The transformer 40 has primary windings 42, 44 and 46 connected to the controlled windings 16, 17 and 18 of the main reactor 20 by conductors 48, 50 and 52. Secondary windings 58, 60 and 62 of the transformer 40 are electromagnetically associated with the primary windings 52, 54 and 56, respectively, and have center taps 64, 66 and 68 connected to an output terminal 80. Opposite ends of the secondary windings 58, 60 and 62 are connected through fuses 82, 84, 86, 88, 90 and 92 to diodes 94, 96, 98, 100, 102 and 104, respectively, thence to an output terminal 110. A suitable voltmeter 112 and ammeter 114 reflect the power circuit condition that obtains at the output terminals 80 and 110.

A conventional tickler circuit for the reactor 20 comprises a rheostat 122 connected across the terminals 80 and 110 through a magnetic amplifier winding 124. A rheostat 126 and magnetic amplifier bias 128 are paralleled with the rheostat 122 as is a D.C. bridge 130.

The D.C. bridge 130 is connected to one side of a step-down transformer 132, the other side of which is connected to one side of a constant voltage transformer 140. The other side of the constant voltage transformer 140 is connected to one side of a normally open start switch 150. The other side of the start switch 150 is connected through a normally closed stop switch 152 to one side of a control transformer 156. The other side of the control transformer 156 is connected across the conductors 10 and 14.

A D.C. bridge 170 is connected across the transformer 140 in association with conventional main reactor tickler windings 172, 174, and 176 and a variable resistance 178. A control relay 180 is also connected across the transformer 140 so as to maintain the tickler circuit for the reactor 20 in the energized condition through a back contact 182 of the relay 180 thereof until the stop switch 152 is opened.

It is to be noted that the foregoing D.C. power supply circuit is conventional in layout and operation and is disclosed herein for the purpose of setting forth one environment wherein the instant invention has particular utility.

As discussed hereinbefore, the reactor 20 is relatively uncontrollable when load thereon, comprising, for example, an electroplating bath connected across the terminals 80 and 110, is reduced to 10% or less of rated capacity of the reactor 20. This problem has been solved, in power supply circuits heretofore known and used, by placing load resistors across the conductors 48, 50, and 52 to maintain at least a 10% load on the reactor 20. However, such load resistances either result in excessive losses or require a disconnect switch to effect removal thereof from the power supply circuit 4 when the circuit is operating at rated capacity.

In accordance with the present invention, the main reactor 20 is preloaded by the reactor preloading circuit 2 when the load across the terminals 80 and 110 and therefore on the reactor 20, is reduced to, for example, 10% or less of rated capacity thereof.

The reactor preloading circuit 2 comprises a shunt reactor 200 having A.C. controlled windings 202, 204 and 206 connected across the conductors 48, 50 and 52. Suitable D.C. control windings 208, 210, and 212 are operatively associated with the main windings 202, 204 and 206 on common cores, respectively, and are energized through a variable resistor 214 from opposite sides of a D.C. bridge 216. The D.C. bridge 216 is energized through a transformer 222 that is connected across the controlled winding 18 of the main reactor 20.

The reactor loading circuit 2 is calibrated when load across the output terminals 80 and 110 of the power supply circuit 4 is at a minimum at which time the variable resistor 214 of the shunt reactor 200 is adjusted so that the current in the control windings 208, 210 and 212 of the shunt reactor 200, and therefore the level of saturation of the cores associated therewith is minimized, thus maximizing the reactance of the controlled windings 202, 204 and 206 to preload the main reactor 20 to approximately 10% of rated capacity. As load on the power supply circuit 4 is increased, current in the control windings of the shunt reactor 200 increases, thereby increasing the level of saturation of the cores associated therewith and decreasing the reactance of the controlled windings 202, 204 and 206, respectively. Thus, the reactance of the shunt reactor 200 automatically increases and decreases as the load on the power supply circuit 4 decreases and increases, respectively.

It is to be understood that the specific construction of the improved reactor loading circuit herein disclosed and described is presented for the purpose of explanation and illustration and is not intended to indicate limits of the invention, the scope of which is defined by the following claims.

What is claimed is:

1. In a reactor controlled power supply circuit,
a source of alternating current,
a pair of output terminals,
a control saturable reactor including
a controlled winding connected to said source of alternating current and said pair of output terminals and
a shunt saturable reactor for loading said control saturable reactor when the load across said output terminals is minimized, said shunt reactor having
a controlled winding shunting said output terminals and
a controlling winding responsive to electrical condition in the controlled winding of said control saturable reactor to preload said control reactor upon the occurrence of a relatively small load across said terminals.

2. In a reactor controlled power supply circuit,
a source of alternating current,
a pair of output terminals,
a control saturable reactor including
an A.C. winding connected to said source of alternating current and said pair of output terminals and
a shunt saturable reactor for loading said control saturable reactor when the load across said output terminals is minimized, said shunt reactor having
a saturable core,
an A.C. winding on the core and shunting said output terminals,
a D.C. winding on the core and
means for controlling the D.C. winding responsive to an increasing load on said output terminals to automatically decrease the reactance of said shunt reactor and responsive to a decreasing load on said output terminals to automatically increase the reactance of said shunt reactor thereby to unload and load said control reactor, respectively.

3. In an electrical circuit comprising a source of alternating current, a pair of output terminals, a control saturable reactor, including a controlled winding connected to said source of alternating current and said pair of output terminals the improvement comprising
means for loading the control saturable reactor to a predetermined level upon a decrease in load across the output terminals below said level comprising
a shunt saturable reactor including
a rectifier,
a variable resistance,
a controlled winding shunting the output terminals of said electrical circuit and
a control winding wound on a common core with said controlled winding and connected across the controlled winding of said control reactor through the rectifier and the variable resistance, adjustment of the variable resistance controlling the D.C. current in the control winding of said shunt reactor thereby to vary the reactance of the controlled windings thereof and the shunt load on the control reactor.

References Cited by the Examiner
UNITED STATES PATENTS

| | | | |
|---|---|---|---|
| 1,996,495 | 4/1935 | Stoller | 321—18 |
| 2,600,639 | 6/1952 | Grandstaff | 321—18 |
| 2,721,303 | 10/1955 | Silver | 321—18 |

LLOYD McCOLLUM, *Primary Examiner.*